United States Patent
Collins

(10) Patent No.: US 7,340,561 B2
(45) Date of Patent: Mar. 4, 2008

(54) COMPUTER MEMORY INITIALIZATION

(75) Inventor: David L. Collins, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 634 days.

(21) Appl. No.: 10/753,276

(22) Filed: Jan. 8, 2004

(65) Prior Publication Data

US 2005/0154850 A1     Jul. 14, 2005

(51) Int. Cl.
*G06F 12/00* (2006.01)
*G06F 13/00* (2006.01)
*G06F 13/28* (2006.01)

(52) U.S. Cl. .......................................... 711/105; 713/1
(58) Field of Classification Search .................... 713/1; 711/105
See application file for complete search history.

(56) References Cited

U.S. PATENT DOCUMENTS

| | | | |
|---|---|---|---|
| 5,423,028 A | 6/1995 | Schieve et al. | |
| 6,571,333 B1* | 5/2003 | Jain et al. | 713/2 |
| 2002/0083369 A1* | 6/2002 | Schelling | 714/36 |
| 2003/0009655 A1* | 1/2003 | Blaner et al. | 713/1 |
| 2003/0065915 A1* | 4/2003 | Yu et al. | 713/1 |
| 2003/0233534 A1* | 12/2003 | Bernhard et al. | 713/1 |
| 2004/0064686 A1* | 4/2004 | Miller et al. | 713/1 |
| 2004/0103272 A1* | 5/2004 | Zimmer et al. | 713/1 |
| 2004/0123088 A1* | 6/2004 | Poisner et al. | 713/1 |
| 2004/0193860 A1* | 9/2004 | Rothman et al. | 713/1 |
| 2005/0086464 A1* | 4/2005 | Lee | 713/100 |
| 2005/0193166 A1* | 9/2005 | Johnson et al. | 711/114 |

OTHER PUBLICATIONS

Enterprise Server Group, "Intel® C440GX+ Server Board Technical Product Specification," Version 1.0, Intel, May 1999, pp. 75-76.

* cited by examiner

*Primary Examiner*—Matthew Kim
*Assistant Examiner*—Edward J Dudek

(57) ABSTRACT

Computer memory is initialized by generating configuration data for a portion of memory, saving the configuration data, restarting computer memory initialization, copying the saved configuration data to initialize the portion of memory, and using the portion of memory to execute instructions to initialize a remainder of memory.

12 Claims, 3 Drawing Sheets

COMPUTER MEMORY INITIALIZATION

BACKGROUND

A computer system performs a power on self test (POST) procedure when it is initially turned on or reset in order to boot and configure itself for operation. POST is performed by a BIOS (Basic Input/Output System), or firmware, stored in a ROM (Read Only Memory) and executed by a processor within the computer system. Among other functions, POST includes initializing (configuring or programming) a memory subsystem of the computer system. The memory subsystem includes physical computer memory and a memory controller by which the physical computer memory is accessed. The physical computer memory includes one or more memory modules, such as SDRAM DIMMs (synchronized dynamic random access memory dual in-line memory modules). Each memory module includes an EEPROM (electrically erasable programmable ROM) or SPD (serial presence detect), which stores SPD data that identifies and describes the memory module. The EEPROM is a nonvolatile memory device, which can store data without losing the data during a system reset.

The initialization of the memory subsystem involves testing and sizing the computer memory (i.e. determining how much physical computer memory is present and useable) and configuring the memory controller to use the computer memory. To do so, the BIOS gathers type, size, speed and memory attributes from the EEPROMs of the memory modules and programs the memory controller accordingly.

Until the memory controller and memory modules are initialized, the memory subsystem cannot be used, so the computer system effectively has no useable memory. Once the memory controller has been configured, the BIOS will program a setting in the memory controller that triggers the memory controller to initialize the memory modules. Then the computer memory is capable of being used.

After the memory subsystem is initialized, it is possible to create, or initialize, variables and a software "stack" within the computer memory. The stack is commonly used in many programming functions, such as upon entering into and exiting from subroutines. Program code, or instructions, that use the stack are referred to as "stack-based." The instructions by which the BIOS initializes the memory subsystem, however, must be "stackless," since the stack cannot be created before the memory subsystem is initialized. Therefore, since the memory initialization instructions are stackless, among other limitations, they cannot include the convenient and simple "normal" method of using variables or using subroutines in which the contents of registers within the processor are saved to the stack upon entering a subroutine and restored to the registers upon exiting from the subroutine. Without the convenience of subroutines and variables, many of the instructions must be repeated within the firmware each time functions reoccur.

The stackless memory initialization instructions are limited to using the registers of the processor as the only available memory spaces. This limitation may not be significant for some processors that have over a hundred registers, but there are other processors that have a considerably smaller set of registers with which to work. The Opteron (TM) processor from AMD, for example, has only six registers. With so few registers, it is very important to be extremely careful how the registers are used. The stackless nature of the instructions operating on such processors, therefore, causes the memory initialization firmware to be relatively complex, detailed and lengthy to ensure that register contents are not lost during memory initialization. The complexity and length of the firmware, however, negatively impacts development cost and time incurred in generating and debugging the firmware.

For some computer systems that have multiple processors (multiple "nodes"), each processor is associated with its own memory subsystem. Upon reset, all of the memory subsystems within the computer system must be initialized. One of the processors, referred to as a "bootstrap" processor, performs all of the initializations, while the other processors remain temporarily inactive. The bootstrap processor surveys each node to discover each memory subsystem, reads all the SPD data from all the DIMMs for each node and programs the memory controller for each node. In this case, the stackless memory initialization instructions are even more complex, detailed and lengthy than in the single-processor case described above, since the instructions are not only stackless, but also must be able to handle multiple nodes.

SUMMARY

According to a particular embodiment of the present invention, a method for performing computer memory initialization comprises generating configuration data for a portion of memory, saving the configuration data, restarting computer memory initialization, copying the saved configuration data to initialize the portion of memory, and using the portion of memory to execute instructions to initialize a remainder of memory.

According to another embodiment of the present invention, a method for initializing computer memory comprises resetting a computer system; determining whether the reset is firmware initiated; upon determining that the reset is firmware initiated, copying saved configuration data to initialize a portion of the computer memory; and using the portion of the computer memory to execute instructions to initialize a remainder of the computer memory.

Additionally, according to yet another embodiment, a computer system comprises first and second memory controllers, first and second computer memory associated with the first and second memory controllers, respectively, a nonvolatile memory space associated with the first computer memory, and firmware. Under control of the firmware the computer system generates configuration data that enables the first memory controller to use the first computer memory, saves the configuration data in the nonvolatile memory space, copies the configuration data to the first memory controller to initialize the first memory controller to use the first computer memory, and uses the first computer memory to initialize the second memory controller to use the second computer memory.

DETAILED DESCRIPTION

Figure 1:
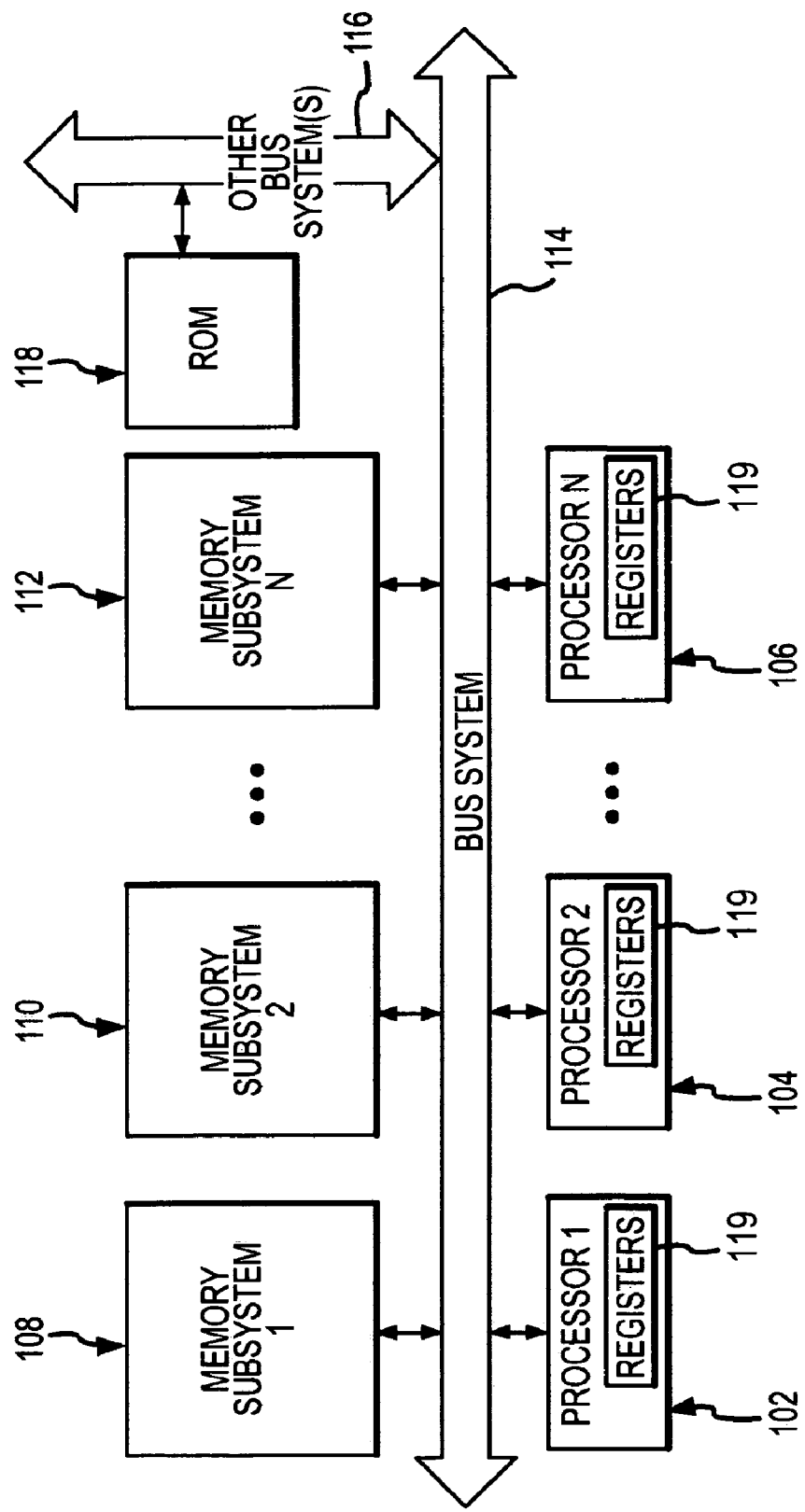
FIG. 1 is a block diagram of a computer system according to an embodiment of the present invention.

A computer system 100 incorporating an embodiment of the present invention is shown in FIG. 1. The computer system 100 generally includes one or more processors (e.g. Intel Pentium (TM), AMD Opteron (TM), etc.) 102, 104 and 106 connected to one or more memory subsystems 108, 110 and 112 through a bus system 114. The bus system 114 also preferably connects the processors 102-106 through one or more other bus systems 116 (e.g. a Peripheral Component Interconnect (PCI) bus, an Industry Standard Architecture (ISA) bus, etc.) to a ROM (read-only memory) 118. The processors 102-106 generally include various registers 119.

Figure 2:
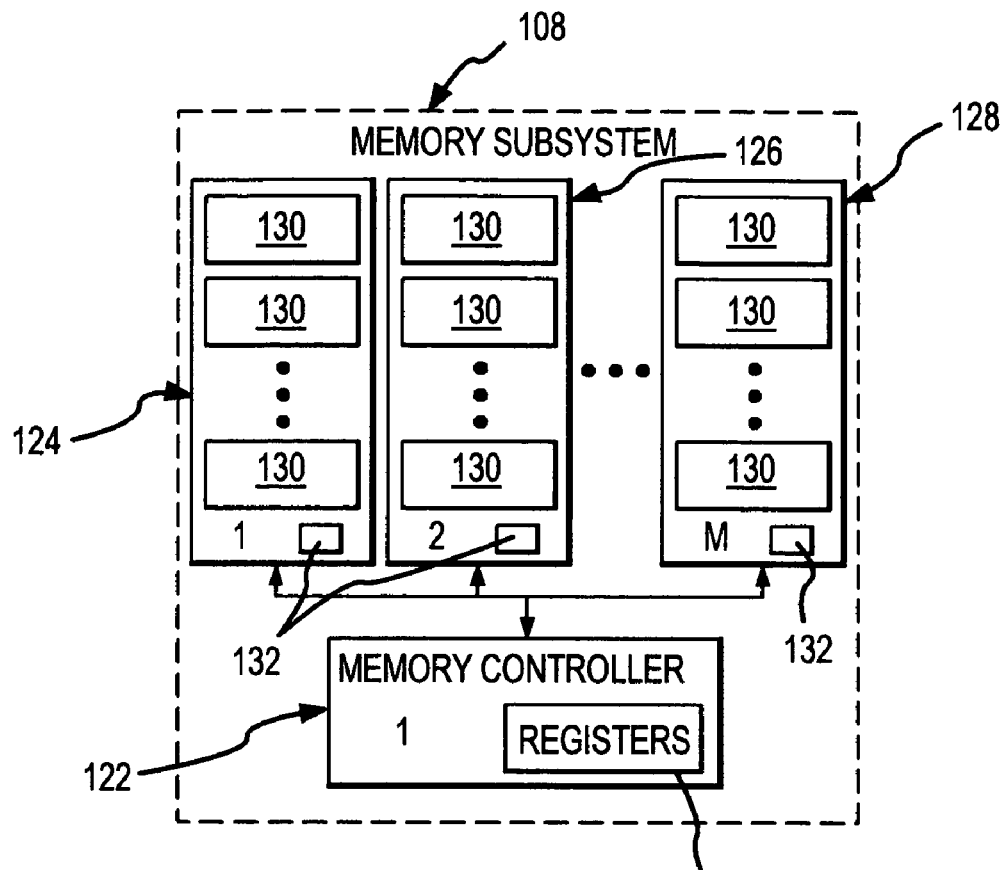
FIG. 2 is a block diagram of a memory subsystem according to an embodiment of the present invention and incorporated in the computer system shown in FIG. 1.

The memory subsystems 108-112, as shown in FIG. 2, preferably include memory controllers 122 and computer memory comprising one or more memory modules 124, 126 and 128. The memory modules 124-128 generally have one or more memory chips 130 and at least one EEPROM 132. The memory controllers 122 generally include various programmable registers 134.

Figure 3:
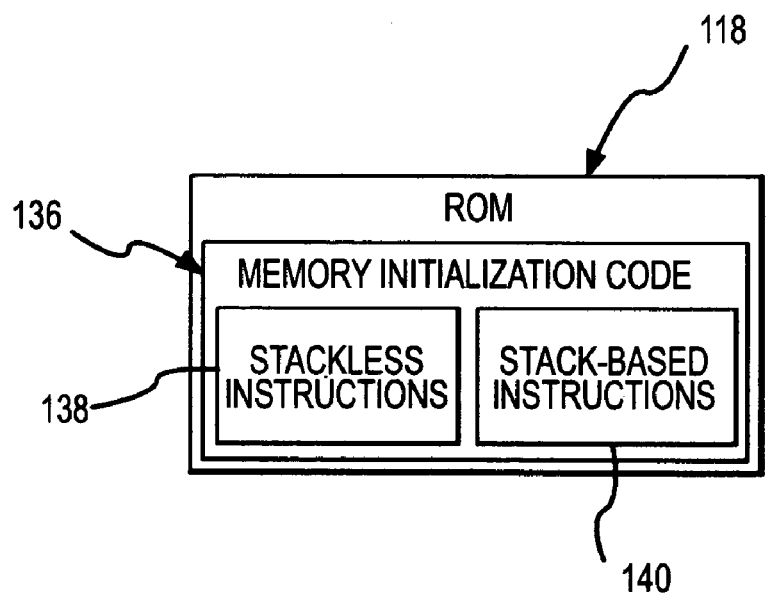
FIG. 3 is a block diagram of a ROM according to an embodiment of the present invention and incorporated in the computer system shown in FIG. 1.

The ROM 118, as shown in FIG. 3, generally stores firmware that includes, among other code, memory initialization code, or instructions, 136. The memory initialization code 136 further includes stackless instructions 138 and stack-based instructions 140.

Although an embodiment of the present invention is described with reference to the computer system 100, the invention is not limited to a computer architecture as shown and described, but may apply to any appropriate computer system and architecture. Additionally, although the memory subsystems 108-112 are shown to have identical configurations, the invention is not so limited, but may include any appropriate memory subsystems 108-112, each having any appropriate configuration. Furthermore, the computer memory may not all be in one sequential row, but may be distributed throughout the system, with cache coherency. Thus, each node is preferably cache coherent with the computer memory of the other nodes.

Upon a boot or a reset of the computer system 100, one of the processors 102-106 (e.g. the first processor 102) serves as a bootstrap processor and reads the contents of the ROM 118 in order to boot up the computer system 100. The memory initialization code 136 within the ROM 118 contains the instructions 138 and 140 under control of which the processor 102 initializes the memory subsystems 108-112. When the processor 102 encounters the memory initialization code 136, the processor 102 initially executes the stackless instructions 138 to find a first occurrence of memory in any one node. For example, the stackless instructions 138 preferably cause the processor 102 to read data stored in the EEPROM 132 of the first memory module 124 of the first memory subsystem 108. Alternatively, the processor 102 reads the EEPROMs 132 of the first and second memory modules 124 and 126, depending on the size of the data path and the size of the memory modules 124-128 used by the computer system 100 (e.g. a 128-bit data path will require pairs of 64-bit memory modules to operate). The data from the first EEPROM 132 (or first two EEPROMs 132) provides information with which, under control of the stackless instructions 138, the processor 102 programs, configures or initializes the memory controller 122 of the first memory subsystem 108 to use the first memory module 124 (or first two memory modules 124 and 126). The processor 102 then instructs the configured memory controller 122 to initialize the first memory module 124 (or first two memory modules 124 and 126).

At this point, the computer system 100 has a "minimal" amount of useable computer memory. Among the final functions of the stackless instructions 138 at this point, is to initialize a stack in the first memory module 124 (or first two memory modules 124 and 126). The processor 102 can thus use the stack under the control of the stack-based instructions 140 to discover (and in some embodiments, also initialize) the remainder of the memory modules 126-128 in the first memory subsystem 108.

The stack-based instructions 140 enable the usage of variables and subroutines. Thus, the stack-based instructions 140 may be considerably shorter and simpler than the stackless instructions of the prior art, since the stack-based instructions 140 can reuse the same subroutines and variables whenever needed, instead of repeating oft-used instructions at many locations within the memory initialization code 136. Since the amount and complexity of the stack-based instructions 140 is reduced, the time and cost to develop and debug the memory initialization code 136 is reduced.

Some currently available memory controllers 122 ("multi-init memory controllers") allow for more than one memory initialization operation after the same reset, but other currently available memory controllers 122 ("single-init memory controllers") allow for only one memory initialization operation after a reset. For a memory subsystem 108 having a multi-init memory controller, therefore, the stack-based instructions 140 are used to discover the remainder of the memory modules 126-128 in the first memory subsystem 108. Then the processor 102 returns to the stackless instructions (so as not to use memory while it is being initialized) to program the memory controller 122 with the complete data for using the entire set of memory modules 124-128, including any preferred memory interleaving scheme. The memory controller 122 is then instructed to initialize all of the memory modules 124-128. The memory subsystem 108 (with the multi-init memory controller) is thus fully configured and operational for use by the processor 102.

On the other hand, for a memory subsystem 108 having a single-init memory controller, upon discovering the remainder of the memory modules 126-128 in the first memory subsystem 108, the memory controller 122 cannot be programmed with the complete data for using the entire set of memory modules 124-128, because the memory controller 122 cannot yet initialize the remainder of the memory modules 126-128. Therefore, the complete configuration information is formatted and assembled, but not yet programmed into the memory controller 122. In this manner, the stack-based instructions 140 create the configuration information with "virtual" registers having a one-to-one correspondence with the actual registers that are in the memory controller 122. The configuration information is saved to the EEPROM 132 of the first memory module 124 (or two memory modules 124 and 126). Alternatively, the configuration information is saved to any available nonvolatile memory within the computer system 100. Since the memory to which the configuration information is saved is nonvolatile, the saved configuration information will survive a reset of the computer system 100. Therefore, at this point, a firmware-initiated reset is executed. Upon returning to the stackless instructions 138 after the firmware-initiated reset, the stackless instructions 138 copy the configuration information (i.e. the virtual registers) from the EEPROM 132 of the first memory module 124 (or two memory modules 124 and 126) to the registers 134 of the memory controller 122. The memory controller 122 is then instructed to initialize all of the memory modules 124-128. The memory subsystem 108 (with the single-init memory controller) is thus fully configured and operational for use by the processor 102.

Once the memory subsystem 108 is fully operational, whether after reset of the computer system 100 or after re-initialization of the memory modules 124-128, another stack is initialized in the memory modules 124-128. The stack-based instructions 140 then take over for discovery of the memory modules 124-128 and configuration of the memory controllers 122 in the other memory subsystems 110 and 112 and complete initialization of the other memory subsystems 110 and 112. In this manner, using the shorter and simpler stack-based instructions 140, the remaining memory subsystems 110 and 112 are made fully operational for use by the other processors 104 and 106.

Figure 4:
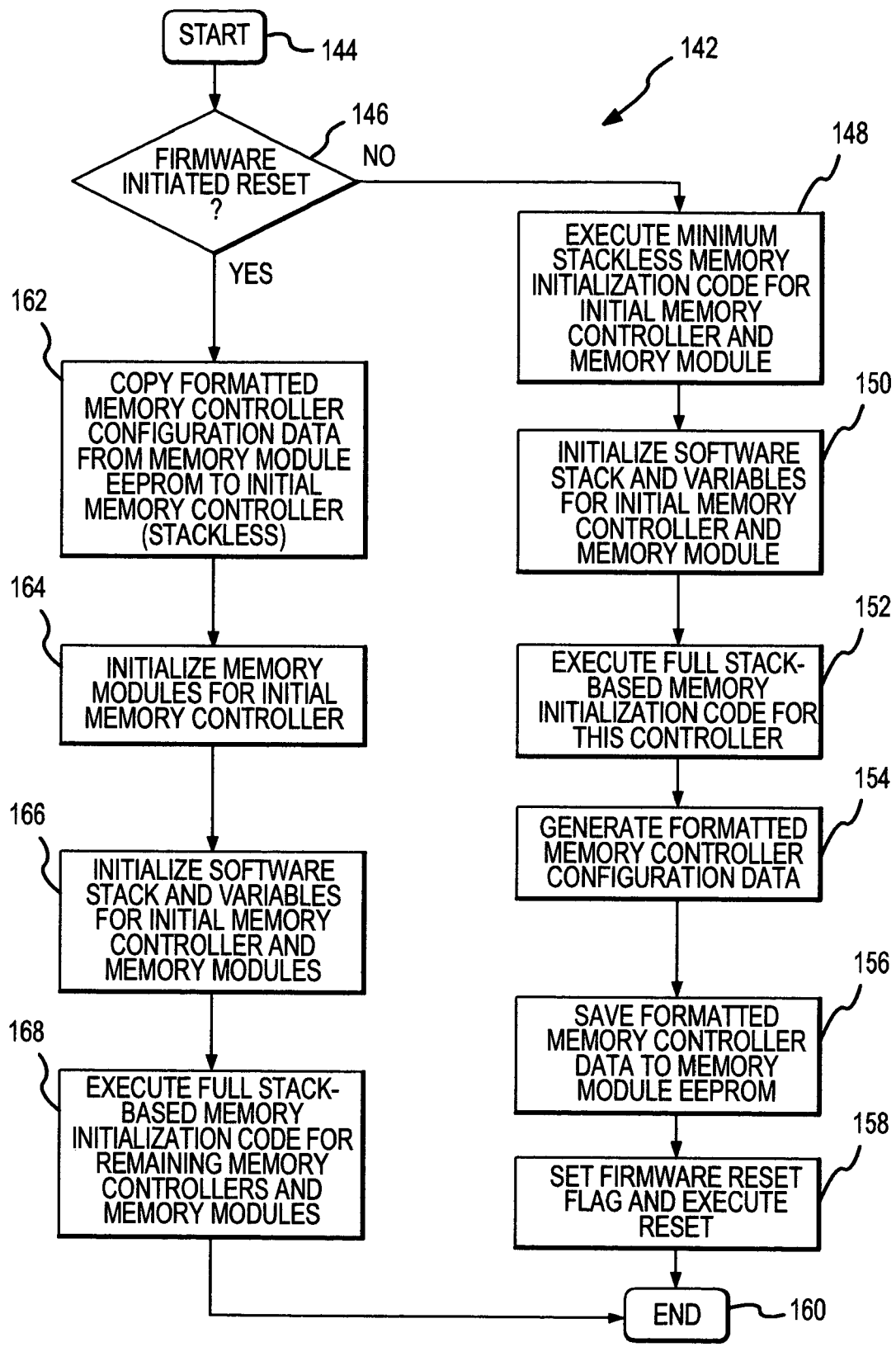
FIG. 4 is a flow chart of a procedure according to an embodiment of the present invention for initializing memory in the computer system shown in FIG. 1.

In accordance with the above description, an embodiment of a procedure 142 for initializing the memory subsystems 108-112 during a boot process of the computer system 100 is described with reference to FIG. 4. Upon starting (at 144), it is determined (at 146) whether the current reset was initiated by firmware. This determination is preferably made by checking the value of a "firmware reset" flag (e.g. a particular bit in the EEPROM 132 of the first memory module 124 of the first memory subsystem 108). If the current reset is not firmware initiated, as determined at 146, then a "minimal" stackless memory initialization code of the stackless instructions 138 is executed (at 148) to discover the initial memory module 124 and EEPROM 132 connected to the memory controller 122 in the initial memory subsystem 108. Thus, the data from one of the EEPROMs 132 is read, one of the memory controllers 122 is programmed and at least one of the memory modules 124 is initialized, preferably the first occurrence of each. The software stack and any desired variables are then initialized (at 150) in the initialized memory module 124 for the programmed memory controller 122. The full stack-based memory initialization code can then be executed (starting at 152) to discover all of the computer memory for the programmed memory controller 122. The complete configuration information for the programmed memory controller 122 is generated and formatted (at 154) using the stack-based instructions 140. The formatted memory controller configuration information is saved (at 156) to the EEPROM 132 of the initialized memory module 124. The firmware reset flag is set and a firmware initiated reset is executed (at 158).

The procedure 142 ends (at 160), but the reset restarts the boot process of the computer system 100. When the procedure 142 restarts (at 144) during the boot process, the firmware reset flag is checked (at 146) again. It is thus determined that the current reset was initiated by firmware, since the firmware reset flag was set prior to the execution of the reset (at 158). The formatted memory controller configuration information is copied (at 162) from the EEPROM 132 of the first memory module 124 of the first memory subsystem 108 to the memory controller 122 of the first memory subsystem 108 using the stackless instructions 138. In this manner, the memory controller 122 is fully programmed. Therefore, the memory controller 122 initializes (at 164) its memory modules 124-128. The software stack and any desired variables are initialized (at 166) in the memory modules 124-128 for the initial memory controller 122. The full stack-based instructions 140 (FIG. 3) of the memory initialization code 136 are executed (at 168) for the memory controllers 122 and memory modules 124-128 of the remaining memory subsystems 110-112 (FIG. 1). The remaining memory controllers 122 and memory modules 124-128 are thus programmed and initialized. The procedure 142 ends (at 160), so any remaining portions of the boot procedure can be executed.

I claim:

1. A method for performing computer memory initialization comprising:
    upon starting computer memory initialization:
        initializing a first memory controller to use a first memory module;
        using the first memory module to initialize a second memory module and generate configuration data;
        generating the configuration data for a portion of memory, the portion of memory comprising the first memory controller and first memory associated with the first memory controller, the first memory comprising the first and second memory modules, and the first memory module comprising an associated nonvolatile memory space;
        saving the configuration data in the nonvolatile memory space; and
        restarting computer memory initialization;
    upon restarting computer memory initialization:
        copying the saved configuration data to initialize the portion of memory by copying the configuration data from the nonvolatile memory space to the first memory controller to enable the first memory controller to use the first memory; and
        using the first and second memory modules of the first memory by the first memory controller to execute instructions to initialize a remainder of memory, which comprises a second memory controller and second memory associated with the second memory controller.

2. A method as defined in claim 1 wherein:
    the restarting comprises a firmware initiated computer memory initialization; and
    the method further comprises:
    determining whether the computer memory initialization is initiated by firmware;
    upon determining that the computer memory initialization is not initiated by firmware, performing the generating, saving and restarting; and
    upon determining that the computer memory initialization is initiated by firmware, performing the copying and using.

3. A method as defined in claim 1 further comprising:
    creating a software stack in the portion of memory; and
    using the software stack to execute stack-based instructions to initialize the remainder of memory.

4. A method for initializing computer memory, comprising:
    resetting a computer system;
    determining whether the reset is firmware initiated;
    upon determining that the reset is not firmware initiated:
        initializing a first memory controller and a first portion of a computer memory associated with the first memory controller using stackless code;
        creating a first stack in the first portion of the computer memory associated with the first memory controller;
        initializing the first memory controller and a second portion of the computer memory associated with the first memory controller using stack-based code;
        saving configuration data for the first memory controller in a nonvolatile memory of the first portion of the computer memory associated with the first memory controller;

setting a firmware reset flag; and
resetting the computer system;
upon determining that the reset is firmware initiated according to the firmware reset flag:
copying the saved configuration data from the nonvolatile memory to the first memory controller;
creating a second stack in the computer memory associated with the first memory controller; and
initializing a second memory controller and a computer memory associated with the second memory controller using stack-based code.

5. A computer system, comprising:
a memory controller;
first and second memory modules;
a nonvolatile memory space; and
firmware, under control of which the computer system:
initializes the memory controller to use only the first memory module;
using only the first memory module, generates configuration data that enables the memory controller to use the first and second memory modules;
saves the configuration data in the nonvolatile memory space; and
copies the configuration data from the nonvolatile memory space to the memory controller to initialize the memory controller to use the first and second memory modules.

6. A computer system as defined in claim 5 wherein the aforementioned memory controller is a first memory controller, further comprising:
a second memory controller;
a first computer memory comprising the first and second memory modules; and
a second computer memory;
and wherein:
under further control of the firmware the computer system:
initiates a reset after saving the configuration data in the nonvolatile memory space;
after the reset, configures the first memory controller to use the first computer memory upon copying the configuration data from the nonvolatile memory space to the memory controller; and
after the first memory controller is configured to use the first computer memory, configures the second memory controller to use the second computer memory.

7. A computer system, comprising:
a processor;
first and second memory controllers separate from the processor;
first and second computer memory associated with the first and second memory controllers, respectively;
a nonvolatile memory space; and
firmware under control of which the processor generates configuration data that enables the first memory controller to use the first computer memory, saves the configuration data in the nonvolatile memory space, copies the configuration data to the first memory controller to initialize the first memory controller to use the first computer memory, and uses the first computer memory to initialize the second memory controller to use the second computer memory.

8. A computer system as defined in claim 7 wherein:
the nonvolatile memory space is associated with the first computer memory.

9. A computer system as defined in claim 7 wherein:
under control of the firmware:
the computer system initiates a reset after saving the configuration data;
the computer system determines whether a current reset is firmware initiated;
if the current reset is firmware initiated, the computer system copies the configuration data to the first memory controller to initialize the first memory controller to use the first computer memory, and uses the first computer memory to initialize the second memory controller to use the second computer memory; and
if the current reset is not firmware initiated, the computer system generates the configuration data that enables the first memory controller to use the first computer memory, and saves the configuration data in the nonvolatile memory space.

10. A computer system comprising:
first and second memory controllers;
first and second computer memory associated with the first and second memory controllers, respectively;
firmware comprising stackless instructions and stack-based instructions; and
a nonvolatile memory space;
and wherein:
the first computer memory comprises first and second memory modules;
under control of the stackless instructions the computer system initializes the first memory module for use by the first memory controller and creates a temporary software stack in the first memory module; and
under control of the stack-based instructions the computer system uses the temporary software stack, generates configuration data that enables the first memory controller to use the first and second memory modules, saves the configuration data in the nonvolatile memory space, and executes a firmware initiated reset; and
after the firmware initiated reset, under control of the stack-based instructions the computer system initializes the second memory controller to use the second computer memory.

11. A computer system as defined in claim 10 wherein:
under control of the stackless instructions the computer system detects the firmware initiated reset, copies the configuration data to the first memory controller, and creates a permanent software stack in the first computer memory; and
under control of the stack-based instructions the computer system uses the permanent software stack and initializes the second computer memory for use by the second memory controller.

12. A computer system comprising:
first and second computer memory;
first and second means for controlling the first and second computer memory, respectively;
a means, separate from the first and second controlling means, for generating configuration data that enables the first controlling means to use the first computer memory;
a means for storing the configuration data during a firmware initiated reset;
a means for executing the firmware initiated reset;
a means, separate from the first and second controlling means, using stackless instructions upon a firmware initiated reset for copying the configuration data from the storing means to the first controlling means to use the first computer memory;

a means for creating a software stack in the first computer memory; and a means, separate from the first and second controlling means, using stack-based instructions for initializing the second controlling means to use the second computer memory.

* * * * *